(12) United States Patent
Takanami et al.

(10) Patent No.: US 10,883,181 B2
(45) Date of Patent: Jan. 5, 2021

(54) HYDROGEN GENERATOR

(71) Applicant: MITSUBISHI HEAVY INDUSTRIES ENVIRONMENTAL & CHEMICAL ENGINEERING CO., LTD., Yokohama (JP)

(72) Inventors: Hiroyuki Takanami, Yokohama (JP); Yusaku Nasu, Tokyo (JP)

(73) Assignee: MITSUBISHI HEAVY INDUSTRIES ENVIRONMENTAL & CHEMICAL ENGINEERING CO., LTD., Yokohama (JP)

( * ) Notice: Subject to any disclaimer, the term of this patent is extended or adjusted under 35 U.S.C. 154(b) by 301 days.

(21) Appl. No.: 15/765,650

(22) PCT Filed: Oct. 17, 2016

(86) PCT No.: PCT/JP2016/080686
§ 371 (c)(1),
(2) Date: Apr. 3, 2018

(87) PCT Pub. No.: WO2017/069083
PCT Pub. Date: Apr. 27, 2017

(65) Prior Publication Data
US 2018/0305828 A1    Oct. 25, 2018

(30) Foreign Application Priority Data

Oct. 20, 2015  (JP) ................................. 2015-206216

(51) Int. Cl.
*C25B 1/10*     (2006.01)
*C25B 9/08*     (2006.01)
(Continued)

(52) U.S. Cl.
CPC .................. *C25B 1/10* (2013.01); *C25B 9/08* (2013.01); *C25B 15/02* (2013.01); *C25B 15/08* (2013.01); *Y02E 60/36* (2013.01)

(58) Field of Classification Search
None
See application file for complete search history.

(56) References Cited

U.S. PATENT DOCUMENTS

| 4,212,714 A | 7/1980 | Coker et al. |
| 4,214,958 A | 7/1980 | Coker et al. |

(Continued)

FOREIGN PATENT DOCUMENTS

| CN | 1878729 A | 12/2006 |
| CN | 101270368 A | 9/2008 |

(Continued)

OTHER PUBLICATIONS

Leng et al, Solid-State Water Electrolysis with an Alkaline Membrane (plus Supporting Information), Journal of the American Chemical Society, vol. 134, No. 22, May 2012, pp. 9054-9057 and S1-S13 (Year: 2012).*

(Continued)

*Primary Examiner* — Harry D Wilkins, III
(74) *Attorney, Agent, or Firm* — Manabu Kanesaka; Benjamin Hauptman; Kenneth Berner

(57) ABSTRACT

Provided is a hydrogen generator which is provided with: an electrolytic cell; an anion exchange membrane which divides the electrolytic cell into a cathode chamber and an anode chamber; a cathode chamber water supply part which supplies water to the cathode chamber; an anode chamber water supply part which supplies water to the anode chamber; a cathode that is provided on the cathode chamber-side surface of the anion exchange membrane; an anode that is provided on the anode chamber-side surface of the anion (Continued)

exchange membrane; a cathode feeder that is arranged within the cathode chamber and feeds power to the cathode; an anode feeder that is arranged within the anode chamber and feeds power to the anode; and an active oxygen reduction material that is arranged within the anode chamber and reduces active oxygen generated within the anode chamber.

4 Claims, 7 Drawing Sheets

(51) Int. Cl.
  *C25B 15/02* (2006.01)
  *C25B 15/08* (2006.01)

(56) References Cited

U.S. PATENT DOCUMENTS

| | | | | | |
|---|---|---|---|---|---|
| 4,294,683 | A | * | 10/1981 | Pere | C25B 15/08 204/258 |
| 4,300,987 | A | * | 11/1981 | Tseung | C01B 13/0214 204/265 |
| 4,323,442 | A | * | 4/1982 | Lantin | C25B 1/10 204/237 |
| 4,331,523 | A | * | 5/1982 | Kawasaki | C25B 9/08 204/258 |
| 4,698,144 | A | * | 10/1987 | Wainerdi | C25B 15/00 204/257 |
| 4,902,397 | A | * | 2/1990 | Kelham | C25B 15/02 204/256 |
| 5,690,797 | A | * | 11/1997 | Harada | C25B 1/12 204/228.5 |
| 6,787,258 | B2 | * | 9/2004 | Prerad | H01M 8/0656 123/3 |
| 2004/0043283 | A1 | * | 3/2004 | Cipollini | H01M 4/8605 429/465 |
| 2004/0072040 | A1 | * | 4/2004 | Duffy | H01M 8/04104 204/237 |
| 2005/0072688 | A1 | * | 4/2005 | Meltser | C25B 1/12 205/628 |
| 2005/0186458 | A1 | * | 8/2005 | Rusta-Sallehy | C25B 9/06 204/228.5 |
| 2007/0131541 | A1 | | 6/2007 | Miyashita | |
| 2010/0270172 | A1 | | 10/2010 | Sano | |
| 2013/0256152 | A1 | * | 10/2013 | Creeth | C25B 1/003 205/637 |
| 2014/0183054 | A1 | * | 7/2014 | Legzdins | C02F 1/461 205/343 |
| 2015/0157976 | A1 | * | 6/2015 | Srinivasan | B01D 53/326 205/763 |
| 2015/0349368 | A1 | * | 12/2015 | Arges | H01M 8/186 429/422 |
| 2017/0244109 | A1 | * | 8/2017 | O'Malley | C25B 9/10 |
| 2018/0274110 | A1 | * | 9/2018 | Nakano | B32B 37/18 |

FOREIGN PATENT DOCUMENTS

| | | |
|---|---|---|
| DE | 102010010905 A1 | 9/2011 |
| DE | 102011053142 A1 | 2/2013 |
| JP | S56-005989 A | 1/1981 |
| JP | S56-005990 A | 1/1981 |
| JP | S58-015544 B1 | 3/1983 |
| JP | 2002-028655 A | 1/2002 |
| JP | 2007-284705 A | 11/2007 |
| JP | 3139159 U | 1/2008 |
| WO | 2007/082898 A2 | 7/2007 |

OTHER PUBLICATIONS

Kuznetsova et al, Identification of the byproducts of the oxygen evolution reaction of Rutile-type oxides under dynamic conditions, Journal of Electroanalytical Chemistry, vol. 728, Aug. 2014, pp. 102-111 (Year: 2014).*

PCT/ISA/210, "International Search Report for International Application No. PCT/JP2016/080686," dated Nov. 22, 2016.

PCT/ISA/237 "Written Opinion of the International Searching Authority for International Application No. PCT/JP2016/080686," dated Nov. 22, 2016.

\* cited by examiner

HYDROGEN GENERATOR

TECHNICAL FIELD

The present invention relates to a hydrogen generator.
Priority is claimed on Japanese Patent Application No. 2015-206216, filed Oct. 20, 2015, the content of which is incorporated herein by reference.

BACKGROUND ART

As apparatuses that electrolyze water to generate hydrogen, apparatuses using an ion exchange membrane (solid polyelectrolyte membrane) as an electrolyte are known. An apparatus having a structure in which a cation exchange membrane that allows cations to pass therethrough is sandwiched by a cathode and an anode (electrode catalyst) formed of a platinum-based noble metal catalyst, a porous feeder, and a main electrode is described in PTL 1. The advantages of this apparatus are that the resistance between electrodes is small, voltage rise does not easily occur even if the current density is increased, and the like.

Meanwhile, in the above related-art apparatus, the cation exchange membrane has strong acidity. Therefore, it is necessary to use a noble metal, such as platinum, having excellent corrosion resistance, as the electrode catalyst. Accordingly, the apparatus cost increases.

In contrast, in recent years, apparatuses adopting an anion exchange membrane that allows anions to pass therethrough as the ion exchange membrane have been developed. The anion exchange membrane is formed of an alkaline material. Accordingly, it is not necessary to use a noble metal, such as platinum, as the electrode catalyst, and an increase in apparatus cost can be suppressed.

CITATION LIST

Patent Literature

[PTL 1] Japanese Examined Patent Application Publication No. 58-15544

SUMMARY OF INVENTION

Technical Problem

However, hydrogen generators using the anion exchange membrane have a problem that members, such as the ion exchange membrane, and gaskets or packings used for an electrolytic cell, are likely to deteriorate as compared to the apparatus using the cation exchange membrane.

The invention is to provide a hydrogen generator capable of suppressing deterioration of a member constituting an electrolytic cell or an anion exchange membrane, in the hydrogen generator that generates hydrogen by electrolyzing water.

Solution to Problem

According to a first aspect of the invention, a hydrogen generator includes an electrolytic cell; an anion exchange membrane that divides the electrolytic cell into a cathode chamber and an anode chamber; a cathode chamber water supply part that supplies water to the cathode chamber; an anode chamber water supply part that supplies water to the anode chamber; a cathode that is provided on a cathode chamber-side surface of the anion exchange membrane; an anode that is provided on an anode chamber-side surface of the anion exchange membrane; a cathode feeder that is arranged within the cathode chamber and feeds power to the cathode; an anode feeder that is arranged within the anode chamber and feeds power to the anode; and an active oxygen reduction material that is arranged within the anode chamber and reduces active oxygen generated within the anode chamber.

According to such a configuration, by providing as the active oxygen reduction material that reduces the active oxygen generated in the anode chamber, it is possible to suppress deterioration such that the member constituting the electrolytic cell or the anion exchange membrane is oxidatively decomposed due to the active oxygen.

In the above hydrogen generator, the active oxygen reduction material may have a catalyst that promotes autolysis of the active oxygen.

According to such a configuration, by promoting the autolysis of the active oxygen using the catalyst, the active oxygen can be reduced by a chemical reaction.

In the above hydrogen generator, the anode feeder may have conductivity and wires arranged so as to fill an internal space of the anode chamber, and the catalyst may be arranged at an outer surface of each of the wires.

According to such a configuration, by coating the wires arranged so as to fill the internal space of the anode chamber with the catalyst, the autolysis catalyst can be uniformly distributed within the anode chamber.

In the hydrogen generator, the active oxygen reduction material may be supplied from a catalyst supply part that adds the catalyst to the water supplied from the anode chamber water supply part.

According to such a configuration, the amount of dispersion of the autolysis catalyst can be increased. Additionally, an ordinary catalyst in which the autolysis catalyst is not arranged can be used as a feeder. Additionally, the amount of the autolysis catalyst can be adjusted in accordance with to the generation situation of the active oxygen.

The hydrogen generator may further include a pressure adjusting part that makes the internal pressure of the cathode chamber equal to or higher than the internal pressure of the anode chamber.

According to such a configuration, by making the internal pressure of the cathode chamber higher than the internal pressure of the anode chamber, the water inside the anode chamber containing the active oxygen can be prevented from passing through the anion exchange membrane toward the cathode chamber or oxidatively decomposing the anion exchange membrane.

Advantageous Effects of Invention

According to the invention, by providing the active oxygen reduction material that reduces the active oxygen generated in the anode chamber, it is possible to suppress deterioration such that the member constituting the electrolytic cell or the anion exchange membrane is oxidatively decomposed due to the active oxygen.

DESCRIPTION OF EMBODIMENTS

First Embodiment

Hereinafter, a hydrogen generator 1 of a first embodiment of the invention will be described in detail with reference to the drawings.

Figure 1:
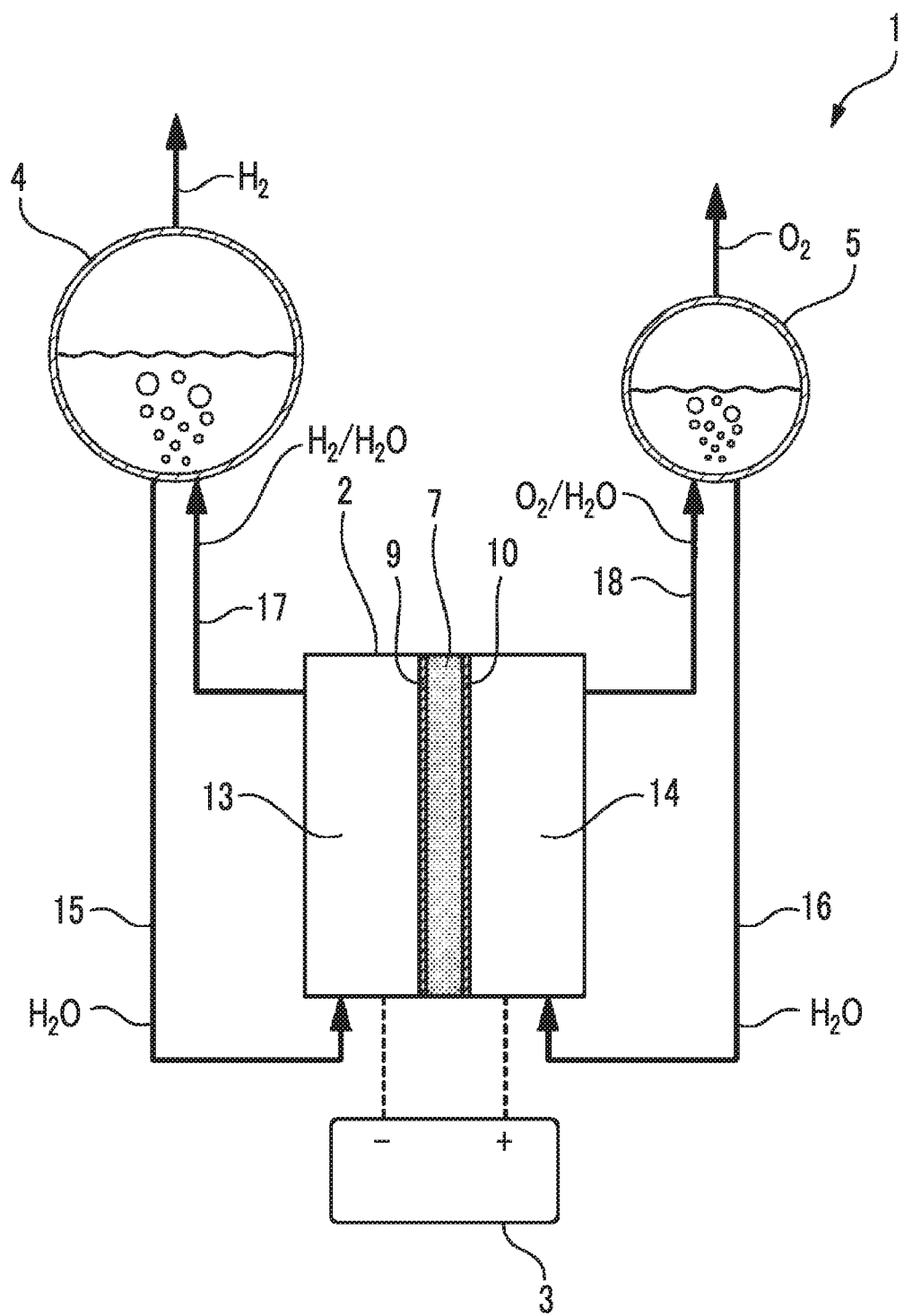
FIG. 1 is a schematic configuration view of hydrogen generator of a first embodiment of the invention.

As illustrated in FIG. 1, the hydrogen generator 1 of the present embodiment includes an electrolytic cell 2, a direct-current power source 3, a hydrogen tank 4 into which hydrogen ($H_2$) generated in the electrolytic cell 2 is introduced, and an oxygen tank 5 into which oxygen ($O_2$) generated in the electrolytic cell 2 is introduced. The hydrogen generator 1 is a device that obtains hydrogen by electrolyzing water within the electrolytic cell 2 ($H_2O$ pure water).

The electrolytic cell 2 is divided into a cathode chamber 13 and an anode chamber 14 by an anion exchange membrane 7 (alkaline ion exchange membrane).

An upper part of the cathode chamber 13 and the hydrogen tank 4 are connected together via a first treated water line 17 into which treated water containing hydrogen is introduced. An upper part of the anode chamber 14 and the oxygen tank 5 are connected together via a second treated water line 18 into which treated water containing oxygen is introduced.

A lower part of the hydrogen tank 4 and a lower part of the cathode chamber 13 are connected together via a first circulation line 15. The first circulation line 15 functions as a cathode chamber water supply part that supplies water to the cathode chamber 13. A lower part of the oxygen tank 5 and a lower part of the anode chamber 14 are connected together via a second circulation line 16. The second circulation line 16 functions as an anode chamber water supply part that supplies water to the anode chamber 14.

Figure 2:
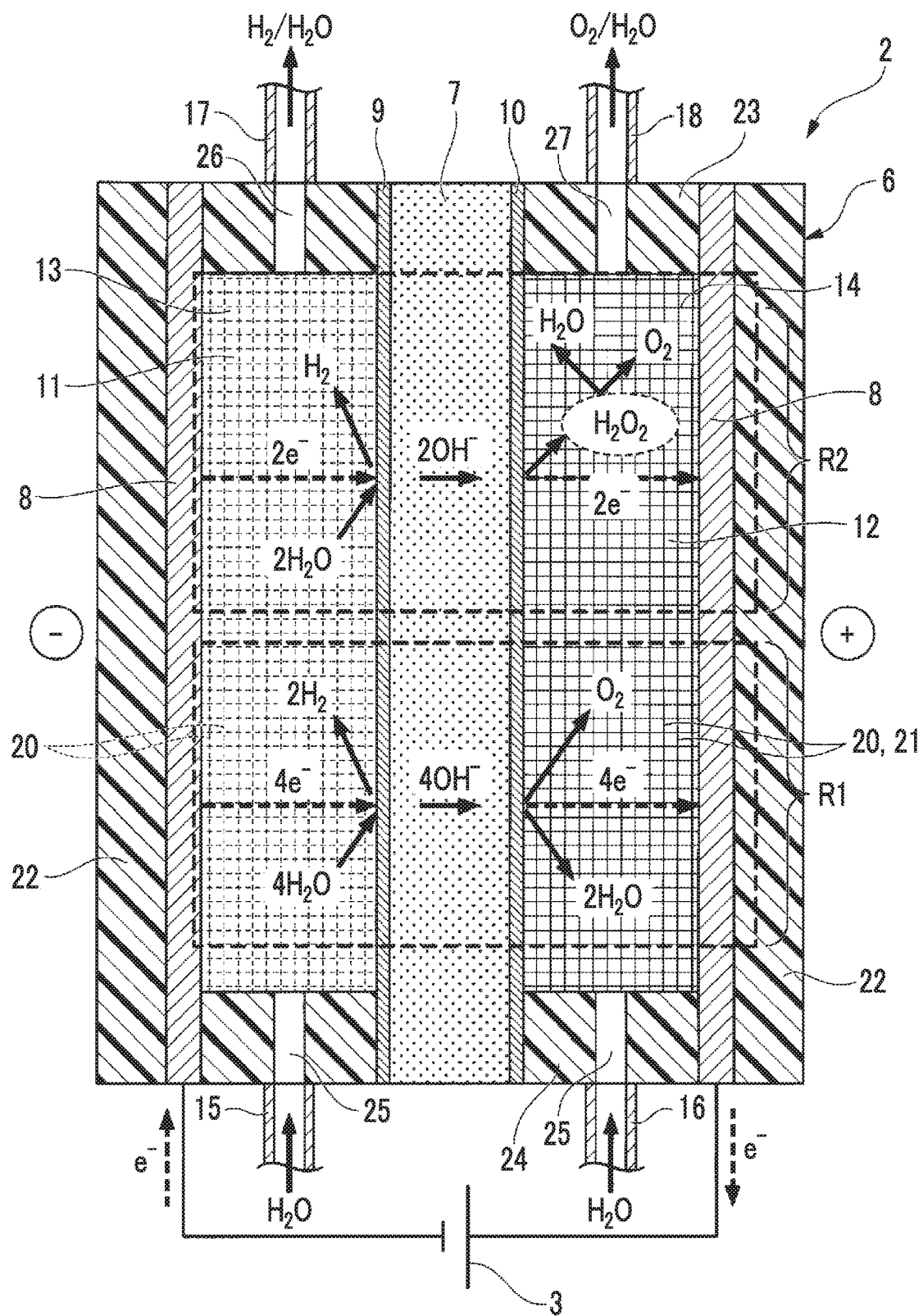
FIG. 2 is a sectional view of an electrolytic cell of the first embodiment of the invention.

As illustrated in FIG. 2, the electrolytic cell includes a casing 6, the anion exchange membrane 7, a cathode 9 formed on a surface (other surface) of the anion exchange membrane 7 on the cathode chamber 13 side, an anode 10 formed on a surface (one surface) of the anion exchange membrane 7 on the anode chamber 14 side, a plate-shaped main electrode 8 connected to the direct-current power source 3, a cathode feeder 11, and an anode feeder 12.

The casing 6 has a side wall 22, an upper wall 23 that seals an upper part of the electrolytic cell 2, and a lower wall 24 with that seals a lower part of the electrolytic cell 2.

The electrolytic cell 2 is divided into the cathode chamber 13 and the anode chamber 14 by the anion exchange membrane 7. The lower wall 24 is provided with water introduction holes 25 for supplying water flowing through the circulation lines 15 and 16 to the cathode chamber 13 and the anode chamber 14. The upper wall 23 is provided with a hydrogen discharge hole 26 for discharging hydrogen and water from the cathode chamber 13. An oxygen discharge hole 27 for discharging oxygen and water from the anode chamber 14 is formed in the upper wall 23.

The anion exchange membrane 7 is an alkaline (basic) ion exchange membrane (electrolyte membrane) that prevents passage of cations and allows passage of anions. As the anion exchange membrane 7, for example, NEOCEPTA AHA (registered trademark) manufactured by ASTOM CO., LTD., or the like, can be used.

The cathode 9 is an electrode catalyst that is attached to the face of the anion exchange membrane 7 facing the cathode chamber 13 and has a number of holes. The anode 10 is an electrode catalyst that is attached to the face of the anion exchange membrane 7 facing the anode chamber 14 and has a number of holes. The cathode 9 and the anode 10 have bonding faces on the surface of the anion exchange membrane by a catalyst material and an anion exchange membrane material being kneaded. That is, the anion exchange membrane 7 is sandwiched between the cathode 9 and the anode 10, and the anion exchange membrane 7, the cathode 9, and the anode 10 are integrated with each other.

The cathode 9 and the anode 10 are formed of transition metals, such as iron, nickel, and cobalt. That is, it is not necessary to use noble metals, such as platinum and iridium, for materials for forming the cathode 9 and the anode 10.

The main electrode 8 is a plate-shaped member that is arranged adjacent to the side wall 22, and is formed of a metal having conductivity.

Figure 3:
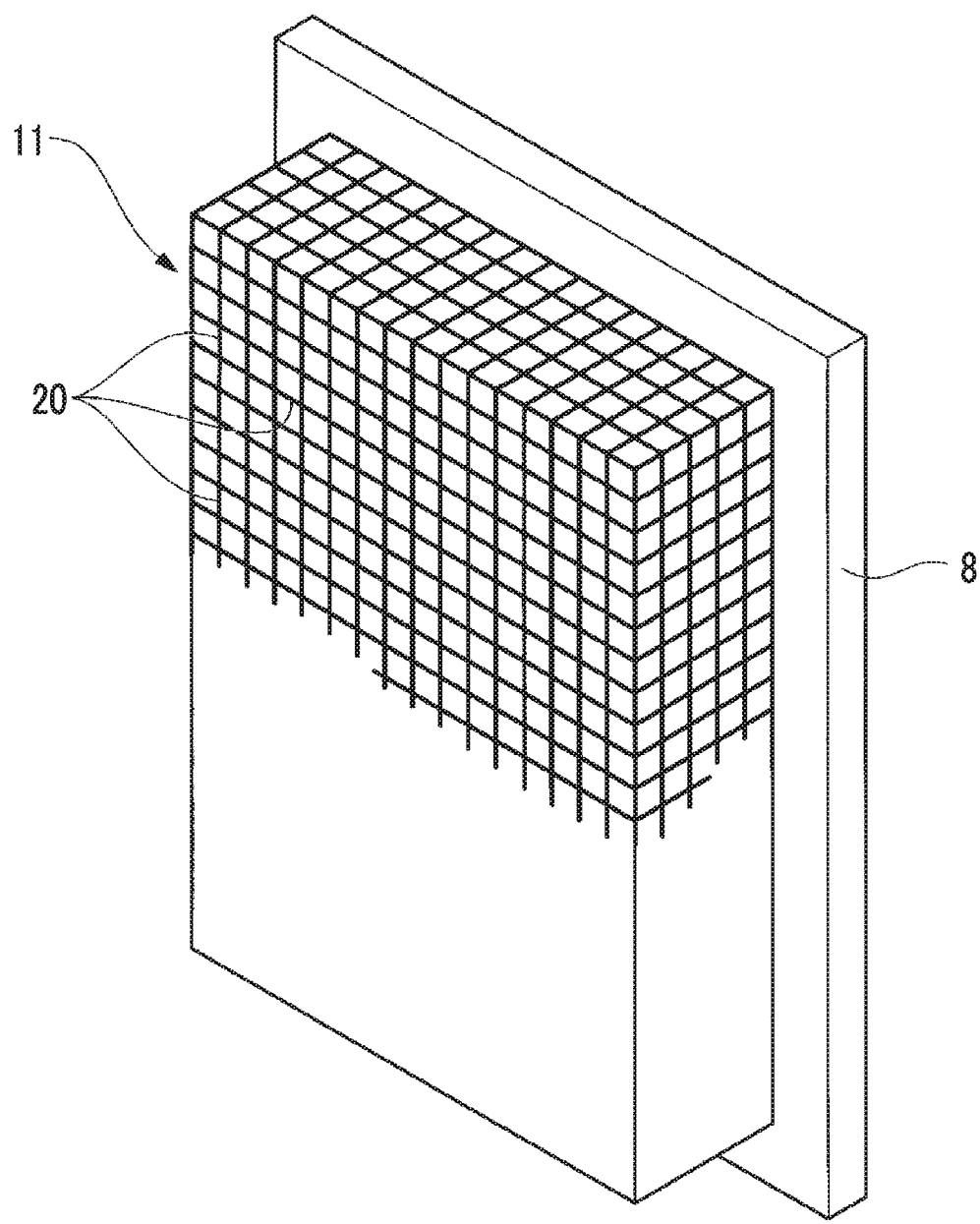
FIG. 3 is a perspective view of a main electrode and a cathode feeder of the first embodiment of the invention.

The cathode feeder 11 is a porous feeder connected to the main electrode 8. As illustrated in FIG. 3, the cathode feeder 11 is constituted of a plurality of conductive wires 20 combined together so as to fill an internal space of the cathode chamber 13. For example, the cathode feeder 11 can be formed from a plurality of meshes made of the wires 20 combined together in a lattice pattern, and the plurality of wires 20 connecting the meshes together. The meshes that form a planar shape are arranged parallel to the main electrode 8, and the wires connecting meshes together extend in a direction orthogonal to the main electrode 8.

The shape of the cathode feeder 11 is not limited to the above-mentioned shape, and the cathode feeder 11 may be a porous structure capable of filing the space of the cathode chamber 13 and allowing a liquid to pass therethrough. For example, a structure in which wires are entangled in the form of a non-woven fabric may be adopted. Additionally, a material having conductivity may be formed in the form of a sponge.

The shape of the anode feeder 12 is almost the same as that of the cathode feeder 11.

Figure 4:
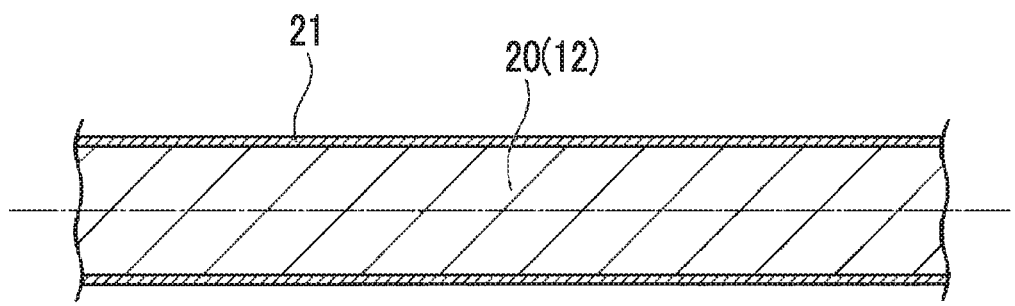
FIG. 4 is a sectional view of a wire of the first embodiment of the invention.

As illustrated in FIG. 4, at least a portion of an outer surface of a wire 20 that constitutes the anode feeder 12 is coated with a catalyst 21 (autolysis catalyst) that promotes autolysis of active oxygen, such as hydrogen peroxide ($H_2O_2$) or ozone ($O_3$).

The autolysis catalyst 21 functions as an active oxygen reduction material, which reduces the active oxygen generated within the anode chamber 14, in the anode chamber 14. An oxide of a transition metal, for example, manganese (Mn), molybdenum (Mo), tungsten (W), tantalum (Ta), or the like can be used as the autolysis catalyst 21. Alternatively, an oxide of a rare earth element, for example, lanthanum (La) can be used as the autolysis catalyst 21. Moreover, a complex oxide of the transition metal or the rare earth metal can be adopted as the autolysis catalyst 21.

In addition, if cost is taken into consideration, it is not preferable to use platinum (Pt) or iridium (Ir) as a material for forming the autolysis catalyst 21.

Figure 5:
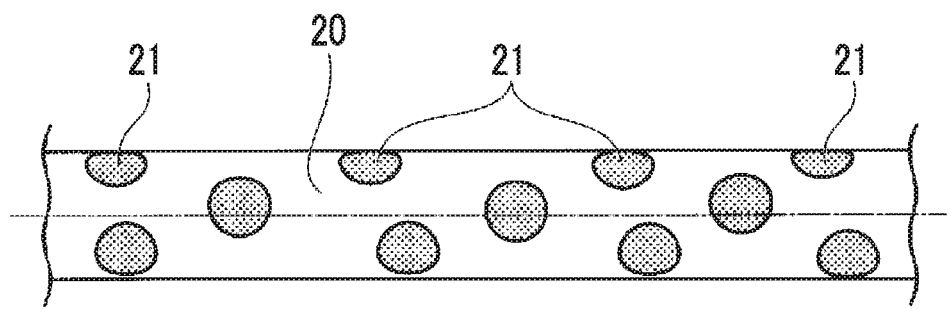
FIG. 5 is a side view the wire of the first embodiment of the invention.

Additionally, the autolysis catalyst 21 may not be uniformly distributed in the wire 20, and may be dispersed on an outer surface of the wire 20 as illustrated in FIG. 5. Namely, the autolysis catalyst 21 may cover at least a portion of an outer peripheral surface of the wire 20. However, it is preferable that the autolysis catalyst 21, is uniformly formed on the outer peripheral surface of the wire 20.

The ratio of the capacity C1 of the hydrogen tank 4 to the capacity C2 of the oxygen tank 5 is C1:C2=2±0.5:1. That is, the capacity of the hydrogen tank 4 is set so as become greater than the capacity of the oxygen tank 5.

Specifically, the capacity C1 of the hydrogen tank 4 and the capacity C2 of the oxygen tank 5 are set such that the internal pressure of the hydrogen tank 4 and the internal pressure of the oxygen tank 5, which vary with the generation of hydrogen and oxygen, become substantially equal to each other.

That is, the ratio of the volume V1 of hydrogen generated in the cathode 9 to the volume V2 of oxygen generated in the anode 10 is V1:V2=2:1. Since the volume V1 of hydrogen is about twice the volume V2 of oxygen, a pressure difference between the internal pressure of the hydrogen tank 4 and the internal pressure of the oxygen tank 5 becomes small by increasing the capacity of the hydrogen tank 4.

Next, the operation of the hydrogen generator 1 of the present embodiment will be described.

If power is supplied to the main electrode 8 in a state where water is supplied from the circulation lines and the water has flowed into the cathode chamber 13 and the anode chamber 14, the water within the cathode chamber 13 is electrolyzed.

In the cathode chamber 13, a reaction as shown in Formula (1) as a forward reaction R1 (refer to FIG. 2) occurs.

$$4H_2O + 4e^- \rightarrow 2H_2 + 4OH^- \quad (1)$$

That is, hydrogen ($H_2$) and hydroxide ions (anions, $OH^-$) are generated by electrolyzing water ($H_2O$) in the cathode chamber 13. In other words, water and electrons ($e^-$) supplied from the cathode feeder 11 react with each other to generate hydrogen. The hydrogen and water that are generated in the cathode chamber 13 are introduced into the hydrogen tank 4, and are separated into gas and liquid.

Hydroxide ions that are anions pass through the anion exchange membrane, and move to the anode chamber 14.

In the anode chamber 14, a reaction as shown in Formula (2) as a forward reaction R1 occurs.

$$4OH^- \rightarrow O_2 + 2H_2O + 2e^- \quad (2)$$

That is, oxygen ($O_2$) and water ($H_2O$) are generated from the hydroxide ions. The oxygen and water that are generated by the anode chamber 14 are introduced into the oxygen tank 5, and are separated into gas and liquid.

Meanwhile, in the anode chamber 14, reactions as shown in Formulas (3) and (4) as side reactions R2 (refer to FIG. 2) occurs.

$$2OH^- \rightarrow H_2O_2 + 2e^- \quad (3)$$

$$2OH^- + O_2 \rightarrow O_3 + H_2O + 2e^- \quad (4)$$

That is, hydrogen peroxide ($H_2O_2$) and ozone ($O_3$) are generated as by-products in the anode 10.

Here, the anode feeder 12 of the present embodiment is coated with the autolysis catalyst 21 that promotes the autolysis of the active oxygen, such as hydrogen peroxide or ozone. Accordingly, autolysis of hydrogen peroxide and ozone shown in Formula (5) and (6) is promoted.

$$2H_2O_2 \rightarrow 2H_2O + O_2 \quad (5)$$

$$2O_3 \rightarrow 3O_2 \quad (6)$$

According to the above embodiment, as the anode feeder 12 arranged at the anode chamber 14 is coated with the catalyst 21 that promotes the autolysis of the active oxygen, it is possible to suppress deterioration such that the anion exchange membrane 7, the casing 6, and gaskets or packings used for the casing 6 are oxidatively decomposed due to the active oxygen, or like.

Particularly, the anion exchange membrane is mainly formed of an organic material, and is likely to be damaged when the active oxygen, such as hydrogen peroxide or ozone, diffuses. Therefore, the autolysis of the active oxygen is promoted and thereby generation of CO is suppressed, which leads to the longer lifespan of the electrode catalyst.

Moreover, since CO generated by the oxidization of the organic material arranged within the electrolytic cell 2 is a poisoning component of the electrode catalyst (the cathode 9, the anode 10), the effect obtained by the autolysis of the active oxygen being promoted is great.

Additionally, by coating the wires 20 arranged so as to fill the space of the anode chamber 14 with the catalyst 21, the autolysis catalyst 21 can be uniformly distributed within the anode chamber 14.

Additionally, since the electrode catalyst is crimped at the anion exchange membrane 7, the electric resistance is low.

Accordingly, the energy efficiency during hydrogen generation can be enhanced. Additionally, by making the capacity of the hydrogen tank 4 greater than the capacity of the oxygen tank 5, a pressure difference between the internal pressure of the cathode chamber 13 and the internal pressure of the anode chamber 14 can be made small. That is, by making the pressure difference between the internal pressure of the hydrogen tank 4 and the internal pressure of the oxygen tank 5, the pressure difference between the internal pressure of the cathode chamber 13 and the internal pressure of the anode chamber 14 communicating these tanks through the lines can be made small. Accordingly, an electrolytic solution of the anode/cathode chamber is transmitted through the electrode and the anion exchange membrane, a decline in current efficiency (=a phenomenon in which generated oxygen and hydrogen are moved to counter electrode chambers and are reverse-electrolyzed and return to water), and damage (=a problem that active oxygen species ($H_2O_2$ and $O_2$) generated in the anode flow back to the anion exchange membrane to oxidatively decompose the membrane) of the anion exchange membrane are easily controlled. In addition, physical deformation or damage of the anion exchange membrane can be prevented.

Figure 6:
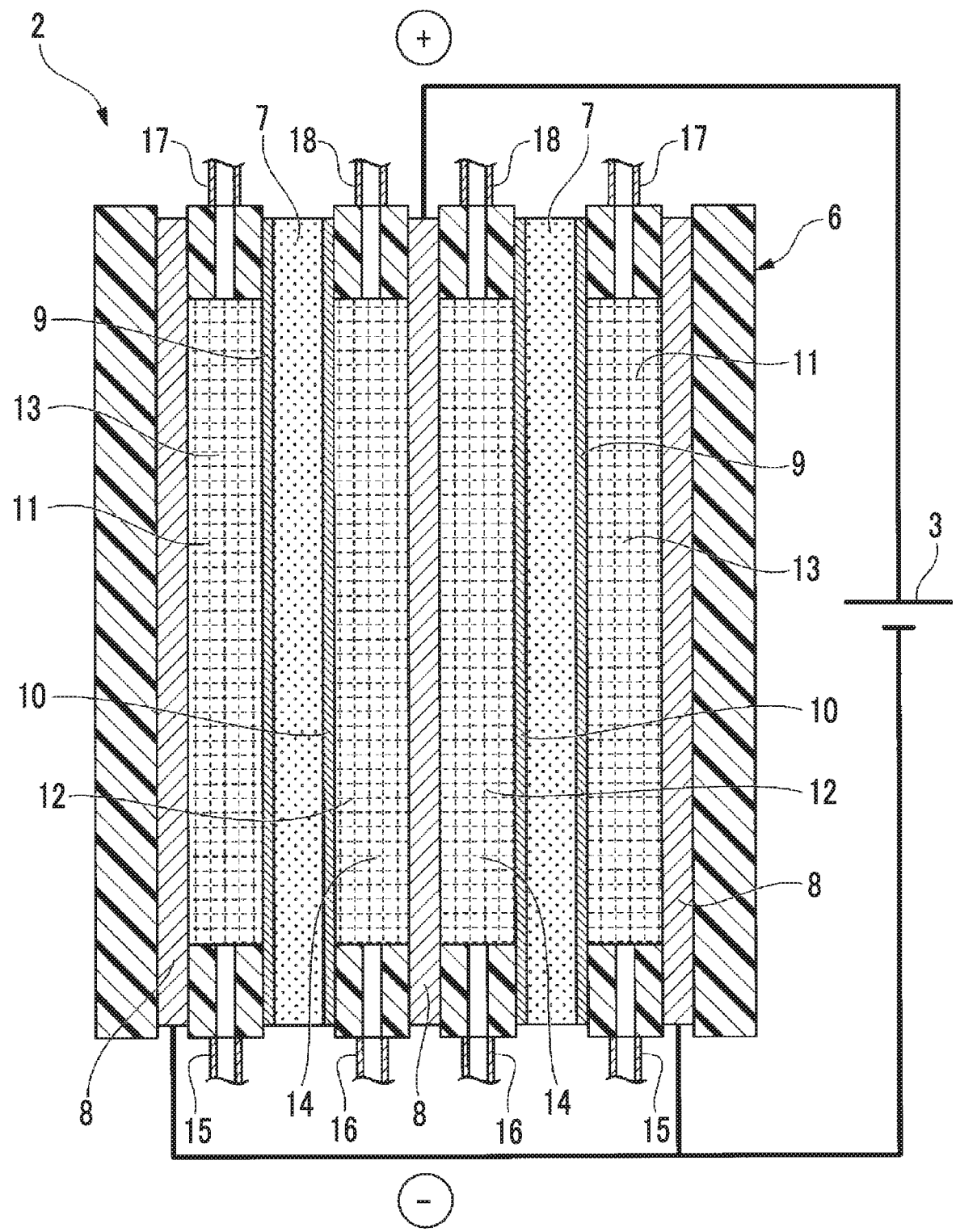
FIG. 6 is a sectional view of the electrolytic cell of a modification example of the first embodiment of the invention.

In addition, the electrolytic cell 2 may have a structure in which a plurality of cathode chambers 13 and anode chambers 14 are provided within the casing 6. For example, a structure in which the positive main electrode 8 is shared by a pair of anode chambers 14 can be adopted as in the electrolytic cell 2 of a modification example of the first embodiment of FIG. 6.

Additionally, in the above embodiment, a configuration in which the water within the hydrogen tank 4 and the oxygen tank 5 are made to circulate through the electrolytic cell 2 is adopted. The invention is not limited to this. The water supplied to the electrolytic cell 2 may be supplied from a separate system. Additionally, the water within the hydrogen tank 4 may be introduced into the oxygen tank 5.

Second Embodiment

Hereinafter, a hydrogen generator of a second embodiment of the invention will be described with reference to the drawings. In addition, in the present embodiment, differences from the above-described first embodiment will be mainly described, and the description of similar portions will be omitted.

Figure 7:
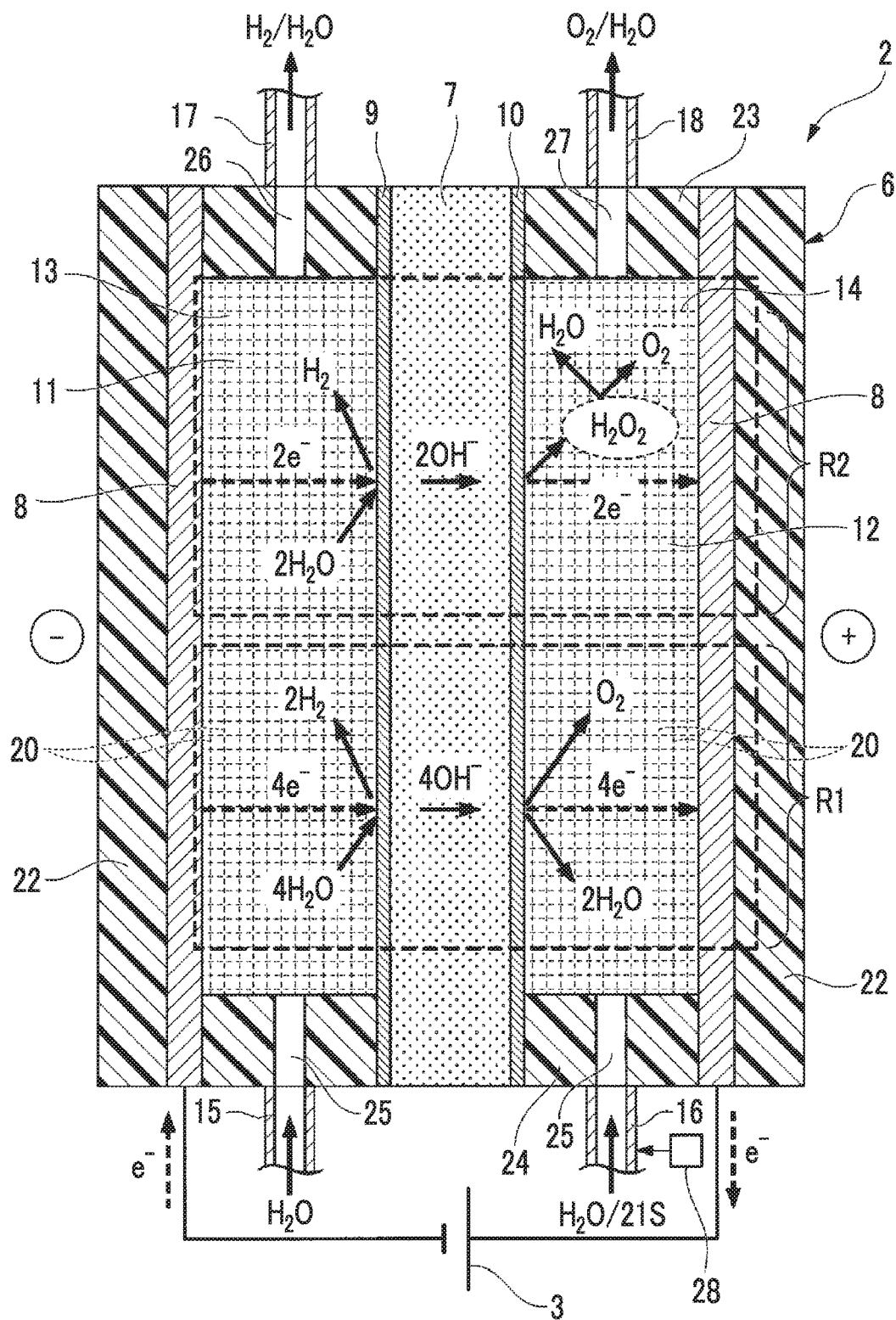
FIG. 7 is a sectional view of an electrolytic cell of a second embodiment of the invention.

As illustrated in FIG. 7, the anode feeder 12 of the hydrogen generator of the present embodiment is not coated by the autolysis catalyst.

The hydrogen generator of the present embodiment has a catalyst supply part 28 that adds autolysis catalyst powder 21S (particulates of the autolysis catalyst) to the second circulation line 16. Accordingly, the water to which the autolysis catalyst powder 21S is added is supplied to the anode chamber 14 via the second circulation line 16. In other words, the water containing the autolysis catalyst powder 21S circulates through the anode chamber 14 and the oxygen tank 5 of the present embodiment.

According to the above embodiment, the amount of dispersion of the autolysis catalyst can be increased.

Additionally, the amount of the autolysis catalyst can be adjusted in accordance with to the generation situation of the active oxygen.

In addition, a configuration in which the second circulation line 16 is provided with the catalyst supply part 28 is adopted in the hydrogen generator of the present embodiment. However, the invention is not limited to this, and the autolysis catalyst powder 21S may be added to water from the beginning.

Third Embodiment

Hereinafter, hydrogen generator 1C of a third embodiment of the invention will be described with reference to the drawings. In addition, in the present embodiment, differences from the above-described first embodiment will be mainly described, and the description of similar portions will be omitted.

Figure 8:
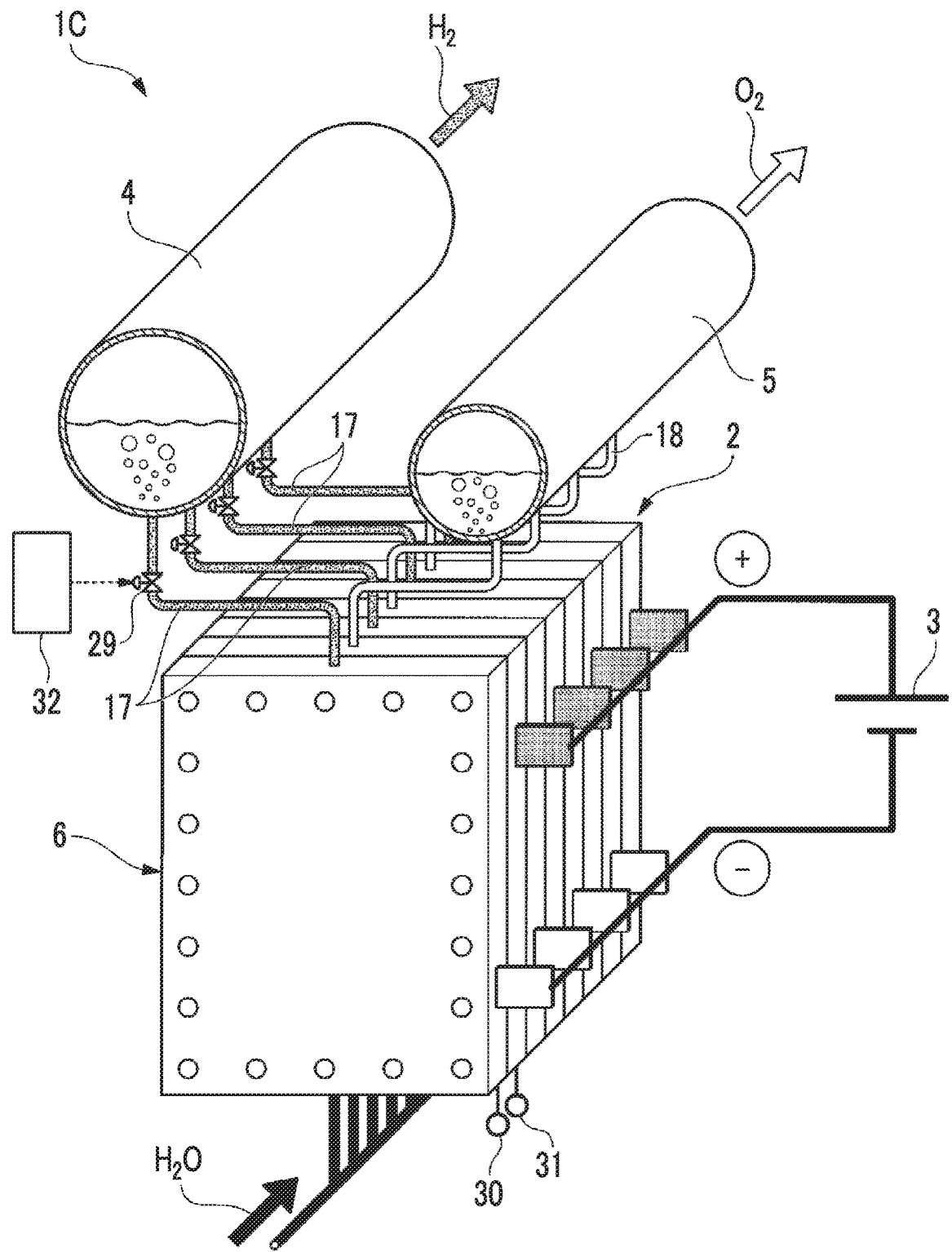
FIG. 8 is a perspective view of a hydrogen generator of a third embodiment of the invention.

As illustrated in FIG. 8, the hydrogen generator 1C of the present embodiment is provided with a flow rate adjusting valve 29 that regulates the flow rate of water and hydrogen flowing through the first treated water line 17. The flow rate adjusting valve 29 is a valve capable of adjusting the flow passage area of the first treated water line 17. In water electrolysis, a pressure difference occurs because the volume ratio of hydrogen and oxygen generated in the cathode chamber and the anode chamber differs as 2:1. For this reason, the flow rate adjusting valve 29 functions as a pressure adjusting part that makes the internal pressure of the cathode chamber 13 equal to or higher than the internal pressure of the anode chamber 14 (refer to FIG. 6). That is, the flow rate adjusting valve 29 has a function of adjusting the pressure difference occurring between the cathode chamber 13 and the anode chamber 14, and adjusts the pressure of the cathode chamber 13 to be equal to or higher than the pressure of the anode chamber 14.

The electrolytic cell 2 is provided with a cathode chamber pressure measuring device 30 that measures the internal pressure of the cathode chamber 13, and an anode chamber pressure measuring device 31 that measures the internal pressure of the anode chamber 14.

The hydrogen generator 1C of the present embodiment includes a control device 32 that adjusts the flow rate adjusting valve 29. The value of the internal pressure of the cathode chamber 13 and the value of the internal pressure of the anode chamber 14, which are measured by the cathode chamber pressure measuring device 30 and the anode chamber pressure measuring device 31, are input to the control device 32. The control device 32 adjusts the flow rate adjusting valve 29 such that the internal pressure of the cathode chamber 13 becomes equal to or higher than the internal pressure of the anode chamber 14.

Here, since the capacity of the hydrogen tank 4 is greater than the capacity of the oxygen tank 5, the pressure difference between the internal pressure of the cathode chamber 13 and the internal pressure of the anode chamber 14 is small.

According to the above embodiment, the flow passage area of the first treated water line 17 can be made small using the flow rate adjusting valve 29. As pressure loss occurs in the first treated water line 17 with the decrease in the flow passage area of the first treated water line 17, the internal pressure of the cathode chamber 13 upstream of the flow rate adjusting valve 29 can be made equal to or higher than that of the anode chamber 14.

By making the internal pressure of the cathode chamber 13 equal to or higher than the internal pressure of the anode chamber 14, the water inside the anode chamber 14 containing the active oxygen can be prevented from passing through the anion exchange membrane 7 toward the cathode chamber 13 or oxidatively decomposing the anion exchange membrane 7.

Additionally, as the capacity of the hydrogen tank 4 and the capacity of the oxygen tank 5 are set so as to make the internal pressure of the cathode chamber 13 and the internal pressure of the anode chamber 14 substantially equal to each other, the pressure difference occurring in the cathode chamber 13 and the anode chamber 14 can be easily adjusted by the adjustment of the flow rate adjusting valve 29.

In addition, in the above embodiments, a configuration is adopted in which the internal pressure of the cathode chamber 13 is made higher in a state where the capacity of the hydrogen tank 4 is made greater than the capacity of the oxygen tank 5 and the pressure difference between the internal pressure of the cathode chamber 13 and the internal pressure of the anode chamber 14 is made small. However, the invention is not limited to this. That is, the internal pressure of the cathode chamber 13 may be easily raised, for example, by making the capacity of the hydrogen tank 4 and the capacity of the oxygen tank substantially equal to each other with no need for making the capacity of the hydrogen tank 4 greater than the capacity of the oxygen tank 5.

Although the embodiments of the invention have been described above in detail with reference to the drawings, the respective components, combinations thereof, or the like in the embodiments are exemplary. Additions, omissions, substitutions, and other modifications of the components can be made without departing from the spirit of the invention. Additionally, the invention is not limited by the embodiments, and is limited only by the scope of the claims.

REFERENCE SIGNS LIST

1: HYDROGEN GENERATOR
2: ELECTROLYTIC CELL
3: DIRECT-CURRENT POWER SOURCE
4: HYDROGEN TANK
5: OXYGEN TANK
6: CASING
7: ANION EXCHANGE MEMBRANE
8: MAIN ELECTRODE
9: CATHODE

10: ANODE
11: CATHODE FEEDER
12: ANODE FEEDER
13: CATHODE CHAMBER
14: ANODE CHAMBER
15: FIRST CIRCULATION LINE (CATHODE CHAMBER WATER SUPPLY PART)
16: SECOND CIRCULATION LINE (ANODE CHAMBER WATER SUPPLY PART)
17: FIRST TREATED WATER LINE
18: SECOND TREATED WATER LINE
20: WIRE
21: AUTOLYSIS CATALYST (ACTIVE OXYGEN REDUCTION MATERIAL)
22: SIDE WALL
23: UPPER WALL
24: LOWER WALL
25: WATER INTRODUCTION HOLE
26: HYDROGEN DISCHARGE HOLE
27: OXYGEN DISCHARGE HOLE
28: CATALYST SUPPLY PART
29: FLOW RATE ADJUSTING VALVE
30: CATHODE CHAMBER PRESSURE MEASURING DEVICE
31: ANODE CHAMBER PRESSURE MEASURING DEVICE
32: CONTROL DEVICE

The invention claimed is:

1. A hydrogen generator comprising:
an electrolytic cell;
a hydrogen tank;
an oxygen tank;
an anion exchange membrane that divides the electrolytic cell into a cathode chamber and an anode chamber;
a cathode chamber water supply part that supplies a first water to the cathode chamber by circulating between the hydrogen tank and the cathode chamber;
an anode chamber water supply part that supplies a second water that is a water in a different system from that of the first water to the anode chamber by circulating between the oxygen tank and the anode chamber;
a cathode that is provided on a cathode chamber-side surface of the anion exchange membrane;
an anode that is provided on an anode chamber-side surface of the anion exchange membrane;
a cathode feeder that is arranged within the cathode chamber and feeds power to the cathode;
an anode feeder that is arranged within the anode chamber and feeds power to the anode;
an active oxygen reduction material that reduces active oxygen generated within the anode chamber by hydroxide ions that move from the cathode chamber to the anode chamber passing through the anion exchange membrane; and
a pressure adjusting part that makes an internal pressure of the cathode chamber equal to or higher than an internal pressure of the anode chamber,
wherein the first water is maintained completely separate from the second water.

2. The hydrogen generator according to claim 1, wherein the active oxygen reduction material has a catalyst that promotes autolysis of the active oxygen.

3. The hydrogen generator according to claim 2, wherein the anode feeder has conductivity and wires arranged so as to fill an internal space of the anode chamber, and
wherein the catalyst is arranged at an outer surface of each of the wires.

4. The hydrogen generator according to claim 2, wherein the active oxygen reduction material is supplied from a catalyst supply part that adds the catalyst to the water supplied from the anode chamber water supply part.

* * * * *